UNITED STATES PATENT OFFICE.

ACHILLE A. BAFFETTI, OF CHICAGO, ILLINOIS.

PROCESS OF TREATING RUBBER TIRES.

1,412,992. Specification of Letters Patent. Patented Apr. 18, 1922.

No Drawing. Application filed November 25, 1921. Serial No. 517,704.

*To all whom it may concern:*

Be it known that I, ACHILLE A. BAFFETTI, a citizen of the United States, and a resident of Chicago, county of Cook, and State of Illinois, have invented a certain new and useful Process of Treating Rubber Tires; and I do hereby declare that the following is a full, clear, and exact description thereof, reference being had to the accompanying drawings, in which like numerals refer to like parts.

This invention relates chiefly to a new process of retreading and repairing rubber tires, which process, as compared with the processes heretofore employed, will save considerable rubber, material and labor and, therefore, is economical, and it also produces inseparable fusion or welding and adds to the life of the repaired or new tire.

Heretofore it has been the practice so far as I know in retreading old tires to tear away the old worn tread and replace it with a new tread or to apply a blue flame torch to the portion to be retreaded and heating it until the old rubber is partly or wholly desulphurized and decomposed in a sense, and resulphurizing it.

In carrying out my improved process I leave the old worn rubber on the tire or treat the tire as it is and apply to the old rubber a coat of a chemical compound. This compound is preferably applied with a brush, but it can be applied in any desired way. The chemical compound will hereafter be explained.

In the second place I preferably vulcanize the tire after such treatment in the usual manner for about fifteen minutes. Then I give it another coat of said chemical compound or an equivalent compound and immediately thereafter a coat of rubber cement. Finally I vulcanize the tire in the usual manner.

When the tire is treated according to the foregoing process and is properly vulcanized, the old rubber is entirely reclaimed and will be practically as good as new rubber, both in appearance and in use. By said method of reclaiming the old rubber, the dead elements in the rubber and rubber cement are recompounded with the live elements and recomposed or formed into a condition similar to new fresh rubber.

In retreading or repairing tires where the rubber is worn out entirely practically, an additional piece of rubber, either old or new, should be applied to the tire. In such case I apply to the old tire preferably two coats of such chemical compound and wait about forty-five minutes and then apply two coats of rubber cement, after which the additional old or new rubber is placed on the tire and the tire is vulcanized in the usual manner. However, if desired, the tire may be vulcanized after the first coat of chemical compound without the application of the rubber cement, although the former two-coat process is preferable.

For general repair on tires having ordinary blow-outs, rim-cuts and the like, it has heretofore been the practice, so far as I am aware, to cut out the old fabric and rebuild with additional new or old fabric. All the old rubber cement is removed entirely and three coats of new rubber cement applied.

In carrying out my improved process for repairing tires for blow-outs, rim-cuts and the like, instead of cutting away the old fabric and removing the old rubber cement, I cut open the old tread and fabric, lay same back and leave on the old rubber cement and apply thereto a coat of said chemical compound and lay the old tread and fabric back into place. Then I vulcanize the tire in the usual manner for about fifteen minutes. By doing this I reclaim the old rubber cement. Then I lay back the old tread and fabric and apply one coat of rubber cement and lay same back into place and again vulcanize it in the usual manner. The effect of this treatment is that it opens the mesh of the old fabric and effects fusion of the old rubber cement with the new rubber cement and allows the rubber cement to penetrate through the mesh of the layers of the fabric so as to form practically rubber rivets through the layers of fabric, which prevent the separation of the layers of fabric and the peeling off of the top tread.

In my process, if desired, instead of vulcanizing after the first coat of chemical compound, one can apply two coats of rubber cement. This modification can also be adopted in retreading.

For retreading or mending blow-outs and rim cuts my above process may be modified as follows, if desired: Wash the tire with a cloth saturated with kerosene and linseed oil, let it dry for about forty-five minutes, then apply two coats of said chemical compound about thirty minutes apart, followed by a heavy coat of rubber cement, after which the tire is vulcanized in the usual manner.

The foregoing is the preferable form of the modified process, but, if desired, one can wash the tire first with kerosene and then with linseed oil, or with vegetable oil, gasoline and carbon tetrachloride, followed by the usual vulcanizing process.

After carrying out the first mentioned or modified process, it is desirable that all moisture be removed from the tire after it has been vulcanized. This can be done by hanging the tire for forty-eight hours more in the air, whereby it will become dried and properly seasoned before the same is placed on the wheel.

In carrying out said first-mentioned and modified processes above explained, the chemical compound used therein is a fluid including in its composition carbon tetrachloride, linseed oil and kerosene or high test gasoline, in approximately the following proportions: carbon tetrachloride 45% portion; linseed oil 10% portion; and kerosene or high test gasoline 45% portion; but the proportions of these ingredients can be reasonably modified without destroying the efficacy of said chemical compound for the purpose herein set forth.

To the foregoing principal and chief ingredients in making said compound, there is preferably added bi-sulphide of carbon, or instead thereof pale rosin, or both kerosene and high test gasoline, or all of said ingredients. In the latter compound containing all of said ingredients, their proportions are substantially as follows; carbon tetrachloride 45%; linseed oil 10%; kerosene 45%; high test gasoline 30%; bi-sulphide of carbon 4%; and petroleum 45%; but the proportions of these ingredients can be reasonably modified without destroying the efficacy of said chemical compound for the purpose herein set forth. Whenever two or more ingredients, such as "kerosene or high-test gasoline" are named, it is understood that in the claims where only one of the two are named, the other is to be understood as an equivalent.

The following formulas have also been found to obtain substantially the same result as the above:

Carbon tetrachloride 45%; linseed oil 5%; kerosene or petroleum 35%; high test gasoline 11% and sulphide of carbon 4%.

Carbon tetrachloride 45%; linseed oil 5%; and kerosene or petroleum 50%.

Wherein it is desired to first cure tires for 15 minutes the following formula may be used:

Kerosene 40%; high test gasoline 40%; linseed oil 4% and carbon tetrachloride 16%.

Then when taking the tire out of the mold while it is hot there should be applied a fluid made of the following formula:

Carbon tetrachloride 45%; kerosene 45%; bi-sulphide of carbon 2% and linseed oil 8%.

However, this latter formula may also be used with the fluid obtained from the above-mentioned three formulas.

The invention claimed is:

1. The process of repairing old rubber tires, which process consists in first applying to the tire a chemical compound including carbon tetrachloride and a vegetable oil, vulcanizing the tire for a short time, then applying thereto rubber cement, and finally thoroughly vulcanizing the tire.

2. The process of repairing old rubber tires, which process consists in first applying to the tire a chemical compound including carbon tetrachloride, vegetable oil and kerosene in substantially the proportions of 45% parts of carbon tetrachloride, 10% parts of vegetable oil and 45% parts of kerosene, vulcanizing the tire for a short time, then applying thereto rubber cement, and finally thoroughly vulcanizing the tire.

3. The process of repairing old rubber tires, which process consists in first applying to the tire a chemical compound including carbon tetrachloride, a vegetable oil, kerosene or the like and bisulphide of carbon or the like, vulcanizing the tire for a short time, then applying thereto rubber cement, and finally thoroughly vulcanizing the tire.

4. The process of repairing old rubber tires, which process consists in first applying to the tire a chemical compound including carbon tetrachloride and a vegetable oil, vulcanizing the tire for a short time, treating the tire again with said chemical compound, then applying thereto rubber cement, and finally thoroughly vulcanizing the tire.

5. The process of repairing old rubber tires having blow-outs, rim-cuts or the like, which process consists in cutting open the old fabric and laying it back, applying to the same a chemical compound including carbon tetrachloride and a vegetable oil, vulcanizing the tire for a short time, applying thereto rubber cement, laying back the fabric, and finally thoroughly vulcanizing the same.

6. The process of repairing old rubber tires which are worn out entirely, which process consists in treating the tire with a chemical compound including carbon tetrachloride and a vegetable oil, after said compound has acted thereon coating the same with rubber cement, adding sufficient additional rubber to fill out and complete the tire, and then thoroughly vulcanizing the tire.

7. The process of repairing old rubber tires which are worn out entirely, which process consists first in applying two coats of a chemical compound including carbon tetrachloride and a vegetable oil to the old tire, waiting about forty-five minutes and then applying two coats of rubber cement, adding sufficient additional rubber to fill out and complete the tire, and finally thoroughly vulcanizing the tire.

8. The process of repairing old rubber tires, which process consists in first applying to the tire a chemical compound including carbon tetrachloride and a vegetable oil, applying two coats of rubber cement thereto, and then thoroughly vulcanizing the tire.

9. The process of repairing old rubber tires, which process consists in first applying to the tire a chemical compound including carbon tetrachloride and a vegetable oil, vulcanizing the tire for a short time, then applying thereto rubber cement, thoroughly vulcanizing the tire, and finally thoroughly drying the tire.

In witness whereof, I have hereunto affixed my signature.

ACHILLE A. BAFFETTI.